United States Patent

[11] 3,564,130

[72] Inventors Horatio N. Crooks;
Raymond L. Hallows, Jr., Princeton, N.J.

[21] Appl. No. 535,883
[22] Filed Mar. 21, 1966
[45] Patented Feb. 16, 1971
[73] Assignee RCA Corporation
a corporation of Delaware

[54] ELECTRONIC PHOTOCOPY SYSTEM
12 Claims, 8 Drawing Figs.

[52] U.S. Cl. 178/6.7; 178/7.5
[51] Int. Cl. H04n 5/84
[50] Field of Search 178/6.6B, 6.7, 7.7; 340/324; 315/22, 30; 96/116

[56] References Cited

UNITED STATES PATENTS 3,158,479 11/1964 Pluess 96/116
3,197,558 7/1965 Ernst 178/6.6

*Primary Examiner*—Richard Murray
*Attorney*—John V. Regan

ABSTRACT: A photocopy system provides a halftone image of a picture composed of continuous tones by producing a plurality of hollow halftone dots corresponding to the continuous tones. Each of the halftone dots comprises an annulus that has a size that corresponds to the density of a tone on the original picture.

INVENTORS
HORATIO N. CROOKS &
RAYMOND L. HALLOWS, JR.
BY John T. O'Halloran
Attorney INVENTORS
HORATIO N. CROOKS &
RAYMOND L. HALLOWS, JR.
BY John T. O'Halloran
Attorney INVENTORS
HORATIO N. CROOKS &
RAYMOND L. HALLOWS, JR
BY John T. O'Halloran
Attorney

ELECTRONIC PHOTOCOPY SYSTEM

The printing processes commonly used in the graphic arts industry, i.e. newspaper and book publishing, etc., deposit a uniform density of ink on paper whenever it is desired to print all or a portion of an object and deposit no ink when the absence of an object is desired. This all-or-nothing process poses no problems when alphabetic and other characters are to be printed. However, when pictures, such as photographs, are to be printed, the problem of reproducing continuous tones (i.e. light gradations) arises. This problem is solved by transforming the continuous tones of the original image into a halftone image that is composed of a large number of inked dots of various sizes. When the dots are made small, the dots and the paper between the dots fuse visually and trick the eye into believing it is seeing continuous tones. The term "halftone" as used in the description to follow means an image that is composed of only black and white elements of various sizes.

To convert the production of newspapers, books, etc., into an automated process under the control of a computer, it is necessary that continuous tone pictures be automatically converted into halftone images so that the standard printing presses may be utilized to reproduce these pictures. Such an automatic process significantly decreases the time required for the preparation of printing page formats and adds the capability of doing so inexpensively when a large number of different page formats are needed.

Accordingly, it is an object of this invention to provide a new and improved photocopy system for producing halftone images.

It is another object of this invention to provide an electronic photocopy system.

It is still another object of this invention to provide an electronic system that converts original pictures having continuous tone images thereon into halftone images.

It is a further object of this invention to provide an electronic photocopy system that converts continuous tone photographs into a form suitable for printing.

A photocopy system embodying the invention generates halftone images from continuous tone original pictures by deriving a plurality of electronic image signals from the continuous tone pictures. Each of the electronic image signals exhibits a characteristic that corresponds to the tone on a portion of the original picture. The electronic image signals are processed and applied to an imaging device to produce a plurality of halftone elements on said device with each element having a size corresponding to the characteristic of its corresponding electronic image signal.

Figure 1:
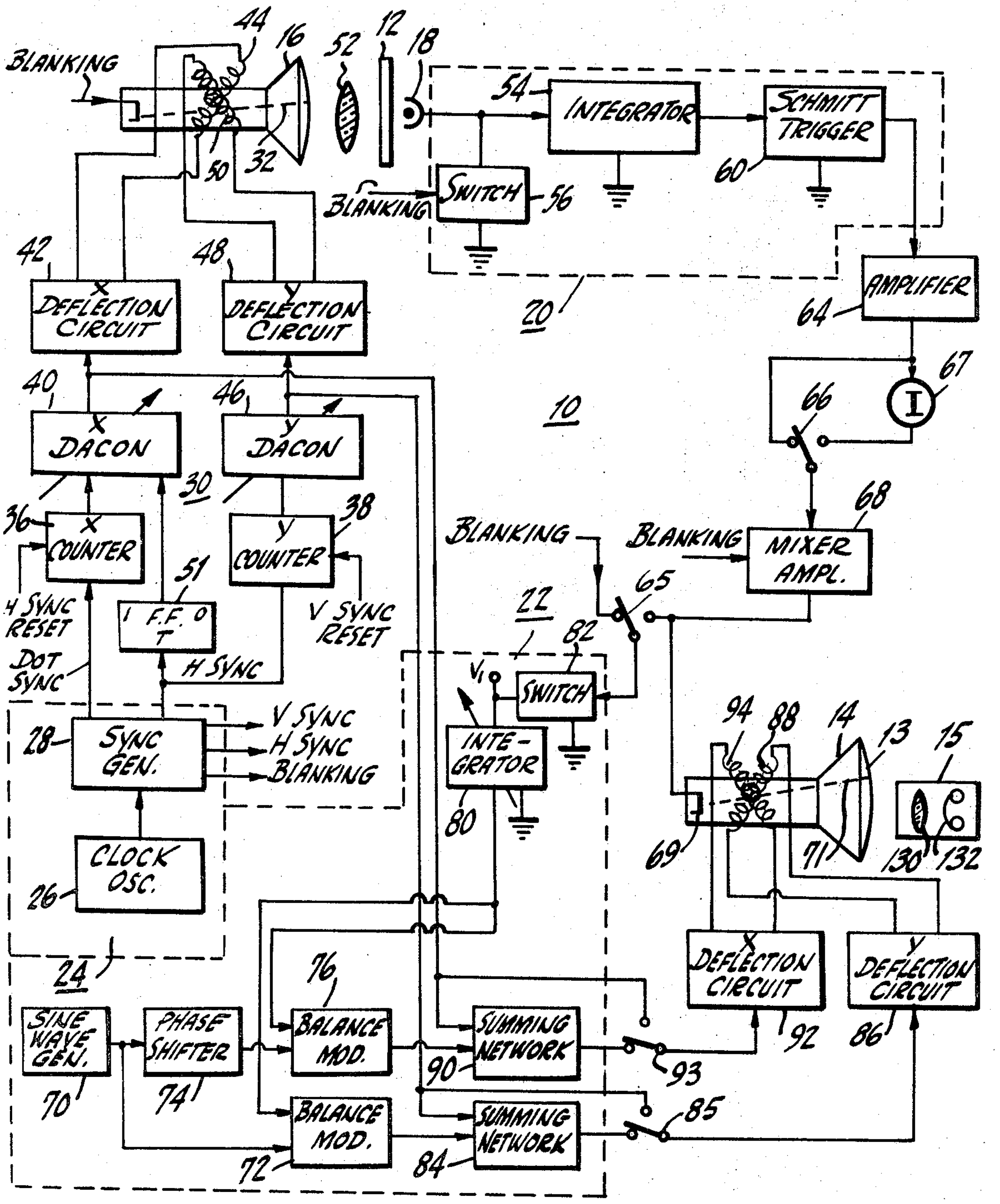
FIG. 1 is a schematic block diagram of an electronic photocopy system embodying the invention.
Figure 5A:
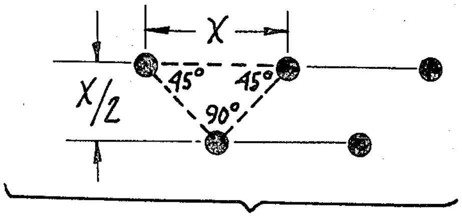
Figure 5B:
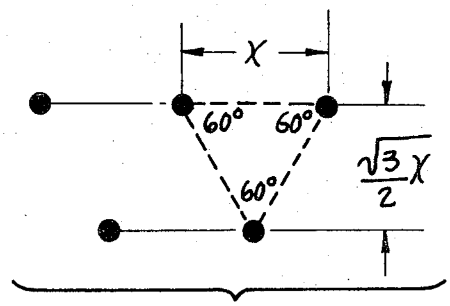
Figures 6A, 6B:
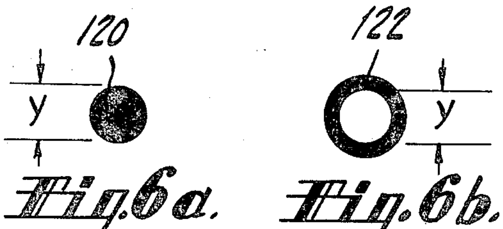

FIGS. 5*a* and 5*b* are illustrations indicating the relative positionings of the halftone elements generated in the system of FIG. 1; and FIGS. 6*a* and 6*b* are illustrations indicating reciprocal halftone elements derivable from the system of FIG. 1.

Referring now to FIG. 1, an electronic photocopy system 10 converts a continuous tone image on a picture or photograph 12 into a halftone image. The halftone image, displayed on an imaging device or display device 14, is photographed by a camera 15 to provide either a positive or a negative of the original scene in halftone image form. Either a positive halftone image or a negative halftone image is therefore obtainable in the system 10. By a positive halftone image, we mean that the tones in the original scene (i.e. the original scene from which the photograph 12 is derived) are accurately duplicated on the face 13 of the display device 14. By a negative halftone image, we mean that the photometric reciprocal of the tones in the original scene are displayed on the face 13 of the display device 14. Since such positive and negative halftone images are the reciprocal of each other, in light transmittance of a given picture element, the operation of the photocopy system 10 to obtain such images is called reciprocal mode operation. The halftones derived from such operation are termed reciprocal mode positive halftones and reciprocal mode negative halftones, respectively. These terms are utilized to distinguish the halftones derived from the reciprocal mode of operation of the system 10 from the halftones derived from a residual mode of operation. When operating the system 10 in the residual mode, either a residual mode positive halftone image or a residual mode negative halftone image is obtainable. The exact meaning of these terms will be given subsequently. The halftone image is produced by utilizing a scanner 16 to scan by a "typewriter" scan pattern the continuous tone image on the picture 12 as is described more fully later. The scanner 16 provides a plurality of optical image signals each having a light intensity related to the tones on discrete portions of the photograph 12. The optical image signals are converted into electronic image signals by a photoelectric transducer 18 and then modulated by a pulse width modulator 20 to produce a plurality of modulated pulse signals each having a width related to the light intensity of the optical image signals. The plurality of modulated pulse signals are applied to a spiral scan halftone generator circuit 22 that generates a plurality of discrete spiral scans in the display device 14, which may, for example, comprise a cathode ray tube. The plurality of spiral scans cause a plurality of halftone elements or dots to be displayed on the face 13 of the device 14. Each element exhibits a size that corresponds to the width of its related modulated pulse signal and consequently to the tones on the original picture 12.

The electronic photocopy system 10 operates under the control of a master timing control circuit 24. The timing control circuit 24 includes a master clock oscillator 26 that produces a plurality of timing signals synchronized by the AC power line frequency. The timing signals generated in the oscillator 26 are applied to a synchronizing signal generator 28. The synchronizing signal generator 28 produces dot synchronizing signals as well as vertical and horizontal synchronizing signals. The generator 28 also generates dot, vertical, and horizontal blanking pulses. The synchronizing and blanking pulses are applied to a deflecting control circuit 30 that controls the scanning pattern of the scanning beam 32 in the scanner 16.

The scanner 16 may, for example, comprise a cathode ray tube flying spot scanner. Each scanline in the scanning pattern produced by the scanning beam 32 in the scanner 16, however, comprises a plurality of dots resembling a typewritten line of periods produced in a typewriter. Such a typewriter scanning pattern or raster differs from the usual flying spot or continuous type scanning pattern by the fact that the deflection control circuit 30 stops the scanning beam 32 during each scanline at a plurality of positions. The scanning beam 32 remains at each position for a predetermined time and then is jumped to the next successive position with the beam 32 blanked during each jump. Such a typewriter scan pattern is illustrated by the dots 33 in FIG. 2. It is to be noted that a continuous type scan may also be utilized with the analogue output signals digitized by sampling these signals with a plurality of clock signals.

Figure 2:
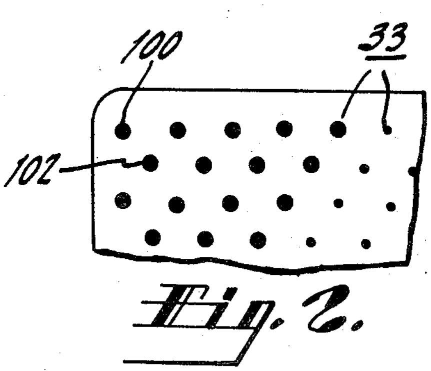
FIG. 2 is a fragment of a scanning raster illustrating a portion of the typewriter scanning pattern utilized in the system of FIG. 1.
Figure 3:
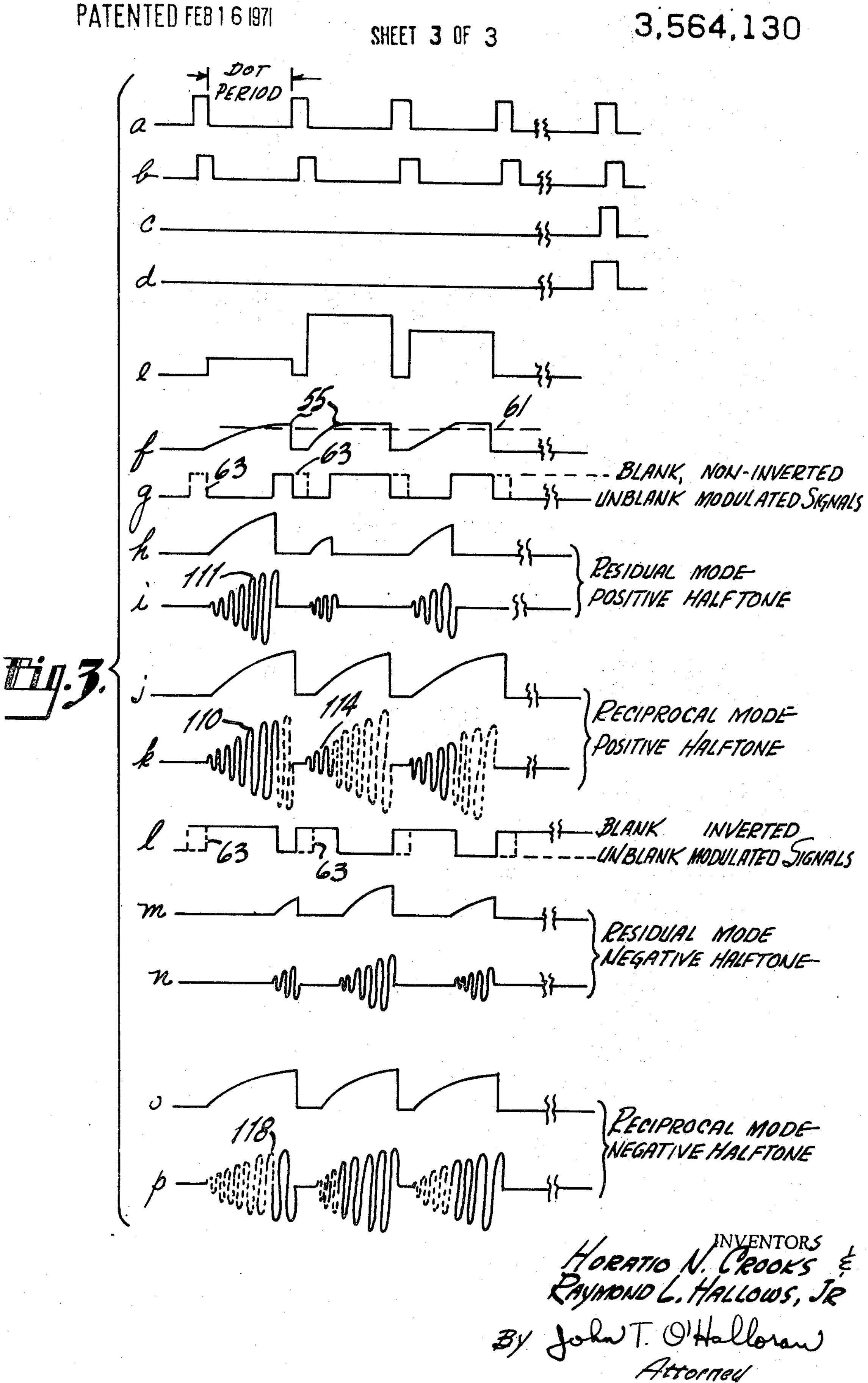
FIG. 3 is a graph illustrating in lines *a* through *p* the waveforms that occur at a plurality of locations in the system of FIG. 1.

The deflection control circuit 30 includes a horizontal or X counter 36 and a vertical or Y counter 38. The horizontal and vertical counters 36 and 38 are coupled to the synch generator 28 to count, respectively, the dot synchronizing pulses and the horizontal or line synchronizing pulses generated therein. The dot sync pulses are shown in line *b* of FIG. 3 and the dot blanking pulses are shown in line *a* of this FIG. A dot period, as shown in line *a* of FIG. 3, is the time period between dot blanking pulses. The counter 36 is reset at the end of every scanline by a horizontal or line sync pulse applied thereto from the synch generator 28. Such a pulse is shown in line *c* of FIG. 3. The counter 38 is reset by a vertical sync pulse generated in the sync generator 28 and applied to reset the counter 38 at the end of every frame. A frame is a scan of the entire face of the scanner 16. The digital or binary signal output count in the counter 36 is converted to an analogue voltage by an X digital-to-analogue converter (DACON) 40 coupled thereto. The horizontal analogue voltage is converted to a current in a horizontal deflection circuit 42. The deflection current is applied to a horizontal deflection coil 44 that deflects the scanning beam 32 in the scanner 16 in the horizontal or X direction. The digital or binary signal output count in the counter 38 is converted to an analogue voltage in a Y digital-to-analogue converter (DACON) 46. The voltage generated in the DACON 46 is converted to a deflection current in a Y deflection circuit 48 which current is applied to a vertical deflection coil 50 in the scanner 16. The scanner 16 is blanked between every dot position and at the end of every scanline and frame by blanking pulses applied thereto from the sync generator 28. As stated previously, the dot and line blanking pulses are shown in lines *a* and *d* of FIG. 3 but, for convenience, the frame blanking and the vertical sync pulses are not shown because they occur only at the end of a frame. A triggerable flip-flop 51 has its trigger terminal T coupled to the sync generator 28 to be alternately set and reset by the horizontal sync pulses generated in the generator 28. The "1" output terminal of the flip-flop is coupled to the X DACON 40 to change the output of this DACON at every other scanline. Such a change displaces the scanning dots 33 in every other scanline as shown in FIG. 2. Such a displacement simulates the 45° displacement that occurs in the typical printing of a halftone image from a Ronchi screen. This scanning pattern is termed a "displaced typewriter scan pattern." The dots 33 are shown in FIG. 2 as being black dots on a white background whereas in fact the dots on the scanner 16 are light and the background is darker.

The light from the dots 33 are imaged onto the continuous tone picture 12 by a lens system shown schematically in FIG. 1 as a single convex lens 52. The continuous tone picture 12 may, for example, comprise a transparent original negative wherein a high degree of transparency denotes darkness and a lower degree denotes lightness in the original scene or person photographed. The light from the dots 33 in the scanning beam 32 produces optical light beams that are transmitted through the picture 12 in amounts or intensity depending upon the tone of the particular portion of the picture 12 being scanned. Thus, the amplitudes of the plurality of optical signals denote the tone characteristics of the picture 12. The plurality of optical image signals are picked up by a phototube 18 and converted into a plurality of electronic image signals that correspond in amplitude to the intensity of light transmitted through the picture 12. Since an electronic image signal is produced for every dot on the scanner 16, the electronic image signals faithfully simulate in amplitude the tones present on the discrete portions of the original picture 12. The image signals are shown in line *e* of FIG. 3. The electronic image signals are applied to a pulse width modulator 20 that includes an integrator 54. The integrator 54 may, for example, comprise a resistive-capacitive circuit which exhibits an RC time constant of a value that causes a predetermined amplitude electronic image signal to charge the integrator to a preselected point before the end of a dot period. The integrated electronic image signal is shown in line *f* of FIG. 3 and the preselected point is the point 55. The integrator 54 is discharged by coupling an electronic switch 56 thereacross. The electronic switch 56 may, for example, comprise a transistor switch that is closed at the end of each dot period as well as the end of each scanline and frame by applying blanking pulses thereto. The integrated electronic image signal is thereby discharged to signal ground. The integrated electronic image signal is applied to a Schmitt trigger circuit 60 in the pulse width modulator 20. The Schmitt trigger 60 is set to fire when the integrated electronic image signal exceeds a predetermined threshold point. The predetermined threshold point is established near the peaks of the integrated image signal such as illustrated by the dotted line 61 in line *f* of FIG. 3. The Schmitt trigger fires when the integrated image signal exceeds the threshold 61 and remains active until the image signal falls below this threshold. The Schmitt trigger 60 produces when active uniform amplitude pulses having varying pulse widths. The pulse width modulated electronic image signals are amplified in an amplifier 64 and applied to one of two parallel paths depending upon whether a negative halftone or a positive halftone is to be produced. The two parallel paths are under the control of a single-pole, double-throw switch 66. When the switch 66 is in the right-hand position in FIG. 1, the modulated image signals are applied through an inverter 67 to a mixer amplifier 68 and a negative halftone of the original scene is produced. The amplifier 68 reshapes the blanking signals in the modulated image signals. When the switch 66 is in the left-hand position, a noninverted modulated image signal is applied to the mixer amplifier 68 and a positive halftone of the original scene is produced. Such a noninverted modulated image signal is shown by the solid line waveform in line *g* of FIG. 3. An inverted modulated waveform is shown in line *1* of FIG. 3. The dotted pulses 63 superimposed in these waveforms are the blanking pulses introduced into the waveforms by the mixer amplifier 68. By an inverted modulated electronic image signal we mean a signal derived from the inverter 67. A noninverted modulated electronic image signal is a signal derived directly from the amplifier 64. The signal from the mixer amplifier 68 is applied to the cathode 69 of the display device 14. When the modulated image signals are applied to the cathode 69, the electron beam 71 in the display device 14 is blanked whenever the amplitude of the modulated signal is high and is unblanked whenever the amplitude is low. The modulated image signals are also applied through a single-pole, double-throw switch 65 to the spiral scan generator 22 when it is desired to operate the system 10 in the residual mode. When reciprocal mode operation is desired, the switch 65 is thrown to the left-hand position, as shown in FIG. 1, to apply only blanking pulses from the sync generator 28 to the spiral scan generator 22.

The spiral scan halftone signal generator 22 generates spiral scans to produce halftone dots on the face 13 of the display device 14. A halftone dot is formed by producing a spiral scan in the electron beam 71 and the dots vary in size depending upon the duration of the spiral scan. The duration of the spiral scan is determined by the width of the pulses in the modulated electronic image signals. The camera 15 records on high gamma, high resolution film the halftone image displayed on the device 14. The phosphor face 13 of the display device 14 functions as an electrooptical transducer to display the halftone dots visually. It is to be noted, however, that the halftone dots may also be recorded directly on film by electron beam recording techniques rather than first visually displaying the dots and then photographing them. Furthermore, the dots formed by the electron beam 71 may also be recorded on material sensitive to the beam 71 for storing until a later time the halftone dots. In all cases, however, the halftone dots are imaged onto some imaging device to be displayed immediately or stored until a later time.

The spiral scan generator 22 includes a sinewave generator 70 that generates and applies a sinewave directly to a first balanced modulator 72. The sinewave generator 70 also applies a sinewave to a phase shifter 74 which shifts the sinewave 90° to convert it into a cosine wave. The cosine wave from the phase shifter 74 is applied to a second balanced modulator 76. The other input to each of the first and second balanced modulators 72 and 76 comprises a modulating wave derived from a variable integrator 80. The integrator 80 may, for example, comprise an RC integrator that is adjustable to control the time constant of charge of the RC charge path. The integrator 80 is coupled to a power supply to charge toward a voltage $V_1$. The integrator 80 is discharged to signal ground by an electronic switch 82 coupled thereacross. The electronic switch 82 which may, for example comprise a transistor switch, is closed to discharge the integrator 80 either by the combined modulated electronic image signal and the blanking pulses as derived from the mixer amplifier 68 or by the blanking pulses alone as derived from the sync generator 28. Various integrator modulating signals are shown in lines *h*, *j*, *m*, and *o* of FIG. 3. The sinewaves in the modulator 72 are modulated by the output from the integrator 80 to provide an exponentially increasing sinewave. Various exponentially increasing sinewaves are shown by the lines *i*, *k*, *n* and *p* in FIG. 3. The balanced modulator 76 produces a similarly increasing cosine wave. The first balanced modulator 72 is coupled to a first summing network 84 along with the analogue voltage produced by the Y DACON 46 in the deflection control circuit 30. The voltage derived from the DACON 46 effectively supplies a baseline bias to vertically position the scanning beam 71 in the display device 14. The added exponentially increasing sinewave alternates the voltage about this baseline. The output of the summing network 84 is applied to a Y deflection circuit 86 in one position of a single-pole, double-throw switch 85. The deflection circuit 86 converts this summed output voltage into a deflection current for application to the vertical deflection coil 88 in the display device 14. The output of the DACON 46 is directly connected to the Y deflection circuit 86 in the second (upper) position of the switch 85. The output of the second balanced modulator 76 along with the output of the X DACON 40 are applied to a second summing network 90 to produce an exponentially increasing cosine wave having a baseline bias included therein. The output of the second summing network 90 is applied to an X deflection circuit 92 in one position of a single-pole, double-throw switch 93. The deflection circuit 92 converts the increasing voltage output of the summing network 90 into a deflection current for application to a horizontal deflection coil 94 in the display device 14. The output of the DACON 40 is directly connected to the X deflection circuit 92 in the second (upper) position of the switch 93. The switches 85 and 93 may be ganged together as shown in FIG. 1. The function of these switches will be described subsequently.

In operation, the continuous tone image on the original picture 12 is converted into a halftone image displayed on the display device 14 and photographed by the camera 15. The scanning beam 32 in the scanner 16 is initially positioned to the upper left-hand corner of the tube 16 when the photocopy system 10 is energized because the counters 36 and 38 are reset to establish such a deflection. The scanner 16 therefore produces the dot 100 as shown in FIG. 2 when the scanning beam 32 is unblanked. The generation of the dot synchronizing pulses and the dot blanking pulses causes the scanning beam 32 is unblanked. The generation of the dot synchronizing pulses and the dot blanking pulses causes the scanning beam 32 to be moved across the scanner 16 producing the displaced typewriter scan pattern shown in FIG. 2. There may, for example, be 250 horizontal dot positions across the face of the scanner 16 and 175 vertical scanlines. Each dot position is determined by the count in the counters 36 and 38. Each dot sync pulse generated in the generator 28 is counted by the counter 36 to produce a digital output count that is converted by the X DACON 40 into analogue voltages. The analogue voltages from the DACON 40 are converted into an analogue current that deflects the scanning beam 32 in steps across the scanner 16. The dot blanking pulses generated in the sync generator 28 are applied to blank the scanning beam 32 in the scanner 16 when the scanning beam 32 moves across the scanner. At the end of one scanline of dots, a horizontal or line sync pulse is produced by the master sync generator and applied to the counter 38. Such a count moves the scanning beam 32 down one scanline. Thus, an orthogonal scanning pattern is produced. A line blanking pulse is also produced at the end of a scanline to blank the scanning beam 32 on retrace to the second scanline position denoted by the dot 102 in FIG. 2. It is to be noted that the dot 102 in FIG. 2 is displaced so as to lie midway between the first two dots in the top scanline. This is accomplished by the triggering of the flip-flop 51 to its set state by the first horizontal sync pulse in a frame. The flip-flop 51, when set, introduces an incremental signal to the X DACON 40 to cause the output of this DACON to displace the dots. When the dots 102 in the second scanning row are displaced to be between the dots in the first scanning row and the rows are spaced apart a distance equal to one-half the spacing between horizontal dots, a 45° scan pattern is produced as shown in FIG. 5*a*. Such a 45° pattern is utilized in mechanical printing by Ronchi halftone screens. Each of the dots 100, 102, etc., is imaged onto the original continuous tone picture 12 by the lens system 34. These dots of light produce beams that are transmitted through the picture 12 with different intensities depending upon whether a light or dark tone appears at the particular portion being scanned on the picture 12. It is assumed in this description that the picture 12 is a negative transparency of an original scene. In the negative transparency 12, a tone is light when a high level of light is transmitted through the transparency and conversely a tone is dark or somewhat opaque to light when a low level is transmitted. It is to be noted that a transparency 12 need not be utilized since the light from the dots 33 will also be reflected from an opaque print.

The light transmitted through the transparent picture 12 is picked up by a phototube 18 that transduces this plurality of optical image signals into a plurality of electronic image signals having an amplitude that varies as a function of the intensity of the light. Each electronic image signal charges the integrator 54, which is then discharged between successive charges by the dot blanking pulses applied to close the switch 56. The amplitude of each image signal alters the charging slope and hence the time at which the threshold level 61 (FIG. 3) is exceeded. The Schmitt trigger 60 fires when the threshold level 61 is exceeded and cuts off when the integrated image signal falls below this threshold. The Schmitt trigger 60 produces uniform amplitude pulses having varying widths depending upon the length of time the integrated electronic signals exceed the threshold level 61. The pulse modulated signals are amplified in the amplifier 64.

There are two different modes of processing left-hand modulated electron image signals from the amplifier 64. The first mode, the reciprocal mode, is described now. In the reciprocal mode of operating the system 10, the switch 65 is thrown to the left-hand position thereof (as shown in FIG. 1) to apply the blanking pulses from the sync generator 28 to the spiral scan generator. To provide a reciprocal mode positive halftone image on the face 13 of the display device 14 the switch 66 is also thrown to the left-hand position thereof (as shown in FIG. 1). Additionally, the switches 85 and 93 are thrown to the lower position as shown in FIG. 1. The blanking pulses occurring at the end of every dot period, as well as at the end of every line and frame, are applied to close the switch 82 shorting the integrator 80 to circuit ground. At the termination of the blanking pulse, the integrator charges along an exponential charge curve toward the energizing voltage $V_1$. Ideally, the charge curve is a desired one-half power law curve. Typical charge curves are shown in line *j* of FIG. 3. The charging curve from the integrator 80 is applied to the balanced modulators 72 and 76 to modulate the sine and cosine waves also applied to these modulators. This modulation produces exponentially increasing sine and cosine deflection waveforms. The summing networks add the deflection bias generated in the control circuit 30 to position the scanning beam 71 in the display device 14 in the same relative location as the scanning beam 32 in the scanner 16 to achieve synchronized scanning. The application of the exponentially increasing sine and cosine waves through the switches to the X and Y deflection coils of the scanner 14 causes Lissajous patterns to be formed on the face of the display device 14. The Lissajous pattern created by a sine and a cosine wave is a circle. Exponentially increasing sine and cosine waves create an increasing circle or a spiral scan.

Figure 4:
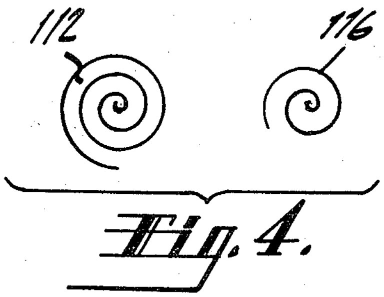
FIG. 4 illustrates the generation of the different sizes of the halftone elements.

Simultaneously with the above, the noninverted modulated signals from the amplifier 64 are applied through the switch 66 to the mixer amplifier 68 wherein blanking pulses are added to these signals, as shown in line *g* of FIG. 3. These mixed signals are then applied to the cathode 69 of the display device 14 to blank the electron beam 71 whenever their amplitude is high. Thus, the exponentially increasing sine and cosine waves cause a dot to appear on the face 13 of the device 14 but the size of the dot is directly proportional to the width of the pulses in the combined blanking modulated signals. Consequently, the exponentially increasing large amplitude sinewave 110 in line *k* of FIG. 3 (along with its corresponding cosine wave) produces a large spiral scan 112 as shown in FIG. 4. The smaller sinewave 114 in line *k* produces a smaller spiral scan 116 also shown in FIG. 4. This is because the display device 14 is blanked at an earlier time of the dot period during which the sinewave 114 occurs than during the dot period wherein the sinewave 110 occurs. The portion of the waves blanked are shown in dotted form in line *k*. The spiral scans 112 and 116 are greatly enlarged in FIG. 4 for clarity. Actually, the scans in a spiral overlap one another to form a bright dot on the display device. The size of the scanning beam 71 and the frequency of the sine and cosine waves relative to the modulating slope are selected to cause the spiral lines to merge. The size of the dot is determined by the width of the modulated image signals which are in turn determined by the tones in the transparency 12. Since a bright spot appears for a dark tone in the negative transparency 12, a positive halftone image of the original scene, from which the transparency 12 is derived, is displayed on the display device 14.

If a reciprocal mode negative halftone image is desired, the switch 66 is thrown to the second position thereof to apply the modulated signals from the amplifier 64 to the inverter 67. The blanking pulses 63 are added to the inverted modulated signal as shown in dotted form in line *l* of FIG. 3. This combined signal is applied to blank the display device 14 whenever the amplitude is high. Due to the inversion in the inverter 67, the blanking now occurs at the beginning of the dot periods rather than at the end thereof. Such a blanking does not prevent the spiral scan deflecting waveform from building up as shown by the exponentially increasing sinewave 118 in line *p* of FIG. 3. However, only the undotted portion of this sinewave operates on the now unblanked electron beam 71 and produces a bright annulus or ring. The annulus encloses a dark area that is exactly equal to the bright area created by the noninverted modulated signal as described previously. This halftone image is therefore a negative of the original scene.

The relation between the reciprocal mode positive and negative halftones is shown in FIGS. *6a* and *6b*. The dot 120 in FIG. *6a* represents a bright dot on the device 14 as produced, for example, by the sinewave 110 in line *k* of FIG. 3, in conjunction with its corresponding cosine wave. The bright annulus 122 surrounding the dark area is produced by the sinewave 118 in line *p* of FIG. 3 in conjunction with its accompanying cosine wave. The diameter Y of the inner rim of the annulus 122 is equal to the diameter Y of the dot 120. These displays are the photometric reciprocals of each other. In the reciprocal mode of operation, accurate positive or negative halftones of the original scene are therefore obtainable in the photocopy system 10.

The residual mode of operating the photocopy system 10 will be described now. In residual mode operation, the switch 65 is thrown to its other position to apply the modulated image signals to the spiral scan generator 22 as well as to the cathode 69 of the display device 14. To obtain a residual mode positive halftone, a noninverted modulated image signal is applied to the mixer amplifier 68 to superimpose blanking pulses thereon to provide a mixed signal, as shown in line *g* of FIG. 3. When such a signal is applied to short out the integrator 80 as well as to simultaneously blank the display device 14 when at a high amplitude level, the integrator 80 only applies an integrating signal to the balanced modulators 72 and 76 when the device 14 is unblanked. Such an integrating signal is shown in line *h* of FIG. 3. The exponentially increasing sinewave resulting from such an integrating signal is shown, for example, by the sinewave 111 in line *i* of FIG. 3. This residual mode waveform 111 is identical to the solid portion of the reciprocal mode waveform 110 in line *k* of FIG. 3. Consequently, the same size positive halftone dots with the same brightness are obtained in both the reciprocal and residual modes of operating the photocopy system 10.

To obtain a residual mode negative halftone, the switch 66 is thrown to the right in FIG. 1 to cause the modulated signals to be inverted in the inverter 67. When the high level inverted modulated signals of line *l* of FIG. 3 simultaneously short out the integrator 80 and blank the display device 14, only the residual portion of the dot period produces a spiral scan as is shown in lines *m* and *n* of FIG. 3. This mode of operation is therefore called residual to distinguish it from the reciprocal mode of operation because the negative halftones derived from each mode differ considerably. By comparing the residual waveforms in lines *m* and *n* of FIG. 3 with the reciprocal waveforms in lines *o* and *p* of the same FIG., it is apparent that with the same selected tone on a photograph 12 the residual mode produces a small solid dot whereas the reciprocal mode produces a large bright annulus or circle. Such different halftone dots therefore require different names.

In any mode of operation, the photocopy system 10 is not limited to producing the 45° Ronchi pattern of halftone dots shown in FIG. *5a*. The X and Y DACONS 40 and 46 are made variable in the system 10 to permit changing the spacing between the halftone dots. Such a change can alter the halftone dots into any desired configuration simply. One desired configuration in which a halftone image appears more pleasing to the human eye than the 45° pattern is the equilateral or 60° pattern shown in FIG. *5b*. No mechanical halftone generation system can match the flexibility achieved in the electronic system 10.

It is also to be noted that the photocopy system 10 is not limited to utilizing the spiral scan generator 22 to generate the halftone dots. The halftone dots may also be generated by utilizing the scattering effect produced by the electrons in the electron beam when they impinge upon the phosphor face 13 of the device 14. The spiral scan generator 22 may therefore be disconnected from the X and Y deflection circuits 92 and 86 by the switches 93 and 85 with the X and Y DACONS 40 and 46 directly connected to the deflection circuits 92 and 86, respectively. The mixer amplifier 68 is also disconnected from the generator 22 by the switch 65. The scanning beam 71 is deflected in the displaced typewriter scanning pattern as previously described. The device 14 is blanked and unblanked in accordance with the width of the modulated image signals applied to the cathode 69 thereof. On a narrow width modulated signal pulse the electron beam 71 remains impinging on one position of the face 13 for a longer time than with a wider pulse. Consequently, the electron scattering in the phosphor face 13 creates a haze disc having a size that is a function of the length of time the beam 71 remains at the one position. The haze disc in combination with the optical aberration of the lens system 130 in the camera 15 and the high gamma film 132 used in the camera 15 provides halftone elements on the film that exhibit sizes corresponding to the tones on the original scene. Such a halation-time system provides an inexpensive halftone generator but with a lower tone fidelity than the spiral scan system.

Thus, in accordance with the invention, an electronic photocopy system is provided that converts continuous tones into accurate positive or negative halftones.

We claim:

1. A photocopy system for generating a halftone image from an original picture having a continuous tone image thereon, comprising in combination:

means for providing a plurality of image signals;

each one of said image signals having a characteristic that corresponds to a tone of said continuous tone picture;

means for converting said plurality of image signals into a plurality of hollow halftone dots with each of said hollow dots comprising an annulus; and an imaging device for displaying said hollow halftone dots to provide a halftone image of said continuous tone picture.

2. A photocopy system in accordance with claim 1, wherein the size of each of said annular halftone dots corresponds to the density of a tone on said continuous tone picture.

3. A photocopy system in accordance with claim 2, wherein said means for deriving said plurality of image signals comprises:

a scanner for scanning said continuous tone pictures to produce a plurality of light image signals each one having an intensity corresponding to the tone on a portion of said continuous tone picture; and a photoelectric transducer coupled to receive and convert said plurality of light signals into a plurality of electronic image signals.

4. The combination in accordance with claim 3 wherein said means for converting said plurality of image signals into a plurality of hollow halftone dots includes a pulse width modulator coupled to said photoelectric transducer to convert said plurality of electronic image signals into a plurality of pulse modulated image signals each having a width corresponding to the tone on a portion of said continuous tone picture.

5. The combination in accordance with claim 4 that further includes:

an imaging device having a scanning beam;

a spiral scan halftone generator coupled to deflect said scanning beam into a plurality of discrete spiral scans;

mode means for applying said modulated image signals to said imaging device to control said spiral scans to produce said halftone dots; and said mode means having a first operating mode for applying said modulated image signals to said imaging device so as to blank said scanning beam starting at a point on each spiral scan, as determined by a corresponding one of said modulated image signals, to the end of said spiral scans so as to produce solid halftone dots.

6. The combination in accordance with claim 5 wherein said mode means includes a second operating mode for applying said modulated image signals to said imaging device to blank said scanning beam starting at the beginning of each of said spiral scans and ending at a point on each spiral scan that is prior to the end of said spiral scan as determined by a corresponding one of said modulated image signals so as to produce hollow halftone dots.

7. A photocopy system in accordance with claim 3 that further comprises a deflection control circuit coupled to said scanner to produce a typewriter scanning pattern that scans said continuous tone picture in a plurality of discrete jumps.

8. In an electronic photocopy system for generating a halftone image from an original picture having a continuous tone image thereon, the combination comprising:

a scanner for scanning said continuous tone picture to produce a plurality of light image signals each one having an intensity corresponding to the tone on a portion of said continuous tone picture;

a deflection control circuit coupled to said scanner to produce a typewriter scanning pattern that scans said continuous tone picture in a plurality of discrete jumps;

said deflection control circuit including a sync generator for generating a plurality of dot synchronizing pulses, a plurality of line synchronizing pulses and a plurality of frame synchronizing pulses, first and second binary counters coupled to count said dot synchronizing pulses and said line synchronizing pulses, respectively, to produce pluralities of first and second digital signals;

first and second digital-to-analogue converters coupled, respectively, to said first and second binary counters to convert said pluralities of first and second digital signals into pluralities of first and second analogue signals;

means for applying said first plurality of analogue signals to deflect the scanning beam of said scanner in a horizontal direction in a plurality of discrete jumps corresponding to the pulse repetition rate of said dot synchronizing pulses to provide a typewriter scanning pattern;

means for applying said line synchronizing pulses to reset said first binary counter at the end of a predetermined number of dot synchronizing pulses to define a scanline for said scanner;

means for applying said second plurality of analogue signals to deflect the scanning beam of said scanner in a vertical direction in a plurality of discrete steps corresponding to the pulse repetition rate of said line synchronizing pulses to introduce an orthogonal pattern into said typewriter scan; and means for applying said frame synchronizing pulses to reset said second binary counter at the end of a predetermined number of line synchronizing pulses to define a frame for said scanner.

9. An electronic photocopy system for generating a halftone image from a picture having a continuous tone image, comprising in combination:

means for deriving a plurality of electronic image signals from said continuous tone picture with each signal having a characteristic that corresponds to the tone on a portion of said continuous tone picture;

an imaging device having a scanning beam;

a spiral scan generator coupled to deflect said scanning beam into a plurality of discrete spiral scans;

switch means for applying said plurality of electronic image signals to said imaging device to produce halftone dots each having a size related to said characteristic; and said switch means having a first position for producing positive halftone dots and a second position for producing negative halftone dots.

10. An electronic photocopy system for generating a halftone image from a picture having a continuous tone image, comprising in combination:

means for deriving a plurality of electronic image signals from said continuous tone picture with each signal having a characteristic that corresponds to the tone on a portion of said continuous tone picture;

an imaging device having a scanning beam;

a spiral scan generator coupled to deflect said scanning beam into a plurality of discrete spiral scans; and means for applying said plurality of electronic image signals to blank said scanning beam at the beginning of each spiral scan for a period of time corresponding to the characteristic of each of said image signals to produce a plurality of hollow halftone dots each having a size corresponding to the tones on said picture.

11. An electronic system for producing a halftone image that simulates a continuous tone image having a variety of different tones, comprising in combination:

means providing a plurality of halftone elements having characteristics corresponding to said continuous tones;

an imaging device;

means for imaging said halftone elements on said imaging device in a predetermined periodic sequence;

means coupled to said imaging device for forming said periodically sequenced halftone elements into a preselected fixed screening pattern with said halftone elements arranged in a plurality of adjacent lines; and means for altering said preselected fixed screening pattern into another desired fixed screening pattern including first variable means coupled to said imaging device for adjustably controlling the spacing between adjacent halftone elements in said lines, and second variable means coupled to said imaging device for adjustably controlling the spacing between adjacent lines of halftone elements.

12. An electronic system in accordance with claim 11 wherein said halftone elements are arranged in a triangular screening pattern with adjacent halftone elements forming equilateral triangles in said triangular pattern.